US012280480B1

(12) United States Patent
Dees

(10) Patent No.: US 12,280,480 B1
(45) Date of Patent: Apr. 22, 2025

(54) ADJUSTABLE CLAMP WITH EXTENDABLE AND RETRACTABLE JAWS

(71) Applicant: Line Work Bucket Products, LLC, Park City, KS (US)

(72) Inventor: Harold Landon Dees, Rose Hill, KS (US)

(73) Assignee: Line Work Bucket Products, LLC, Park City, KS (US)

( * ) Notice: Subject to any disclaimer, the term of this patent is extended or adjusted under 35 U.S.C. 154(b) by 0 days.

(21) Appl. No.: 18/797,262

(22) Filed: Aug. 7, 2024

(51) Int. Cl.
*B25B 5/04* (2006.01)
*B25B 5/16* (2006.01)

(52) U.S. Cl.
CPC ................ *B25B 5/04* (2013.01); *B25B 5/163* (2013.01)

(58) Field of Classification Search
CPC .................................... B25B 5/04; B25B 7/04
See application file for complete search history.

(56) References Cited

U.S. PATENT DOCUMENTS 3,149,390 A 9/1964 McCoy
D350,892 S 9/1994 Sorensen
D399,729 S 10/1998 Chen
5,876,026 A 3/1999 Chen
D457,409 S 5/2002 Noniewicz
D470,029 S 2/2003 Wolff
D473,776 S 4/2003 Hopper et al.
D476,208 S 6/2003 Lee
D481,606 S 11/2003 Ben-Gigi
D485,481 S 1/2004 Wolff
D491,433 S 6/2004 Noniewicz
D491,434 S 6/2004 Noniewicz
6,761,094 B2 * 7/2004 Tobako .................. B25G 1/043 403/328
D514,914 S 2/2006 Degen
7,415,912 B2 * 8/2008 Tyler ......................... B25B 5/12 81/367
D718,999 S 12/2014 Robinson et al.
D719,807 S 12/2014 Robinson et al.
8,915,173 B2 * 12/2014 Clinton ...................... B25J 1/00 86/44
9,027,913 B2 5/2015 Li
D750,462 S 3/2016 Noniewicz et al.

(Continued)

OTHER PUBLICATIONS

Hubbell Power Systems; Hotsick Blanket Clamp, 1 page; https://www.hubbell.com/hubbellpowersystems/en/products/p/293470.

(Continued)

*Primary Examiner* — Seahee Hong
(74) *Attorney, Agent, or Firm* — Hovey Williams LLP

(57) ABSTRACT

An adjustable clamp has first and second handles that are pivotally joined together and first and second jaws that extend respectively from the first and second handles and end in first and second nose tips. Each of the first and second jaws has an inner portion that is housed within an outer portion in a manner to allow relative movement between the inner portion and the outer portion to move the first and second jaws between a retracted position and an extended position to decrease and increase a longitudinal length of the first and second jaws. A spring is associated with the first and second handles and exerts a biasing force to move the first and second handles away from each other and cause the first and second nose tips to apply a clamping force.

20 Claims, 17 Drawing Sheets

(56) References Cited

U.S. PATENT DOCUMENTS

| | | | | |
|---|---|---|---|---|
| 9,821,439 | B2 * | 11/2017 | Smith | B25B 7/06 |
| D830,809 | S | 10/2018 | Kuo | |
| 10,201,891 | B2 * | 2/2019 | Williams | B25B 5/163 |
| 10,272,546 | B2 | 4/2019 | Li | |
| 10,384,332 | B2 | 8/2019 | Li | |
| 10,391,512 | B1 * | 8/2019 | Samuel | B05B 1/202 |
| 10,399,210 | B1 | 9/2019 | Rauckman et al. | |
| D868,556 | S | 12/2019 | Nafso | |
| 10,792,790 | B2 | 10/2020 | Li | |
| 11,253,975 | B2 | 2/2022 | Liu | |
| 2007/0052145 | A1 * | 3/2007 | Cantin | B25B 5/163<br>269/6 |
| 2015/0008631 | A1 * | 1/2015 | Liu | B25B 7/16<br>269/164 |
| 2023/0287912 | A1 | 9/2023 | Kriz | |

OTHER PUBLICATIONS

Rauckman; Rubber Blanket Clamp Pins; 1 page; https://rauckmanutility.com/products/rubber-blanket-clamp-pins/.

Salisbury; Pin Blanket Clamp; 2 pages; https://www.salisburyonline.com/product/1200/salisbury-pin-blanket-clamp-wood-10l-with-pin-boots-26.

The Bucket Cover; Locking Blanket Clamp (Single), 3 pages; https://www.thebucketcover.com/shop/p/c6wdk9qk9wi5bw78800j4e6wod6wd3-ng3rg-j5stt.

* cited by examiner

ADJUSTABLE CLAMP WITH EXTENDABLE AND RETRACTABLE JAWS

BACKGROUND

The present disclosure relates to clamping devices and, more particularly, to clamping devices to hold electrically insulating blankets in place on power lines.

A lineman will typically work on overhead power lines while standing in a bucket connected to a truck mounted boom lift. When one or more of the power lines is live, the lineman will often drape one or more blankets made of rubber or another electrically insulating material over the live power lines to shield the lineman from inadvertently coming into contact with the live power lines. A number of clamps made of a nonconducting material are then used to temporarily hold the blanket in place. These clamps are similar to pliers in that they have a pair of handles that are connected to opposing jaws and are manipulable about a pivot pin. The clamps include a spring that biases the jaws toward a closed position. In use, the lineman squeezes the handles of the clamp together to open the jaws sufficiently to allow them to be placed over the draped blanket and then releases the handles to allow the spring to move the jaws back into the clamping position. An open area between the jaws is designed to accommodate the doubled thickness of the draped blanket and the power line.

A lineman will typically carry at least two sizes of clamps in the bucket to accommodate power lines of different sizes and blankets of different thicknesses. Because the lineman must also carry a number of other tools in the bucket, free space is limited in the bucket. As a result, a need has arisen for a type of clamp that can be adjusted for use with different sizes of power lines and thicknesses of blankets so that the number of clamps that must be carried in the bucket can be reduced.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, the present disclosure is directed to an adjustable clamp comprising: a first handle; a first jaw extending from the first handle and ending in a first nose tip opposite from the first handle, the first jaw comprising an inner portion that is housed within an outer portion in a manner to allow relative movement between the inner portion and the outer portion to move the first jaw between a retracted position and an extended position to decrease and increase a longitudinal length of the first jaw; a second handle; a second jaw extending from the second handle and ending in a second nose tip opposite from the second handle, the first jaw comprising an inner portion that is housed within an outer portion in a manner to allow relative movement between the inner portion and the outer portion to move the second jaw between a retracted position and an extended position to decrease and increase a longitudinal length of the second jaw; the first and second handles being pivotally joined together so that movement of the first and second handles in a direction towards each other moves the first and second jaws in an opposite direction away from each other; and a spring associated with the first and second handles that exerts a biasing force to move the first and second handles in a direction away from each other and cause the first and second nose tips to apply a clamping force.

In another aspect, the present disclosure is directed to adjustable clamp comprising: a first handle; a first jaw extending from the first handle and ending in a first nose tip opposite from the first handle, the first jaw comprising an inner portion that is housed within an outer portion in a manner to allow relative movement between the inner portion and the outer portion to move the first jaw between a retracted position and an extended position to decrease and increase a longitudinal length of the first jaw; a second handle; a second jaw extending from the second handle and ending in a second nose tip opposite from the second handle, the first jaw comprising an inner portion that is housed within an outer portion in a manner to allow relative movement between the inner portion and the outer portion to move the second jaw between a retracted position and an extended position to decrease and increase a longitudinal length of the second jaw; the first and second handles being pivotally joined together so that movement of the first and second handles in a direction towards each other moves the first and second jaws in an opposite direction away from each other; and a spring associated with the first and second handles that exerts a biasing force to move the first and second handles in a direction away from each other and cause the first and second nose tips to apply a clamping force, wherein the first jaw has a longitudinally concave surface that faces in a direction toward the second jaw and the second jaw has a longitudinally concave surface that faces in a direction toward the first jaw, and wherein the first and second handles and the first and second jaws are constructed of a polymeric material.

In a further aspect, the present disclosure is directed to an adjustable clamp comprising: a first handle; a first jaw extending from the first handle and ending in a first nose tip opposite from the first handle, the first jaw comprising an inner portion that is housed within an outer portion in a manner to allow relative movement between the inner portion and the outer portion to move the first jaw between a retracted position and an extended position to decrease and increase a longitudinal length of the first jaw; a second handle; a second jaw extending from the second handle and ending in a second nose tip opposite from the second handle, the first jaw comprising an inner portion that is housed within an outer portion in a manner to allow relative movement between the inner portion and the outer portion to move the second jaw between a retracted position and an extended position to decrease and increase a longitudinal length of the second jaw; the first and second handles being pivotally joined together so that movement of the first and second handles in a direction towards each other moves the first and second jaws in an opposite direction away from each other; a spring associated with the first and second handles that exerts a biasing force to move the first and second handles in a direction away from each other and cause the first and second nose tips to apply a clamping force, the spring comprising an intermediate coiled portion that forms a pivot axis for the first and second handles and tangential arms that extend from opposite ends of the coiled portion and each engage against the first and second handles or against the first and second jaws; and the first jaw and the second jaw each including a lock comprising a detent mechanism that releasably maintains the first and second jaws in the extended position, wherein the first jaw has a longitudinally concave surface that faces in a direction toward the second jaw and the second jaw has a longitudinally concave surface that faces in a direction toward the first jaw, and wherein the first and second handles and the first and second jaws are constructed of a polymeric material.

BRIEF DESCRIPTION OF THE DRAWINGS

The present disclosure is described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
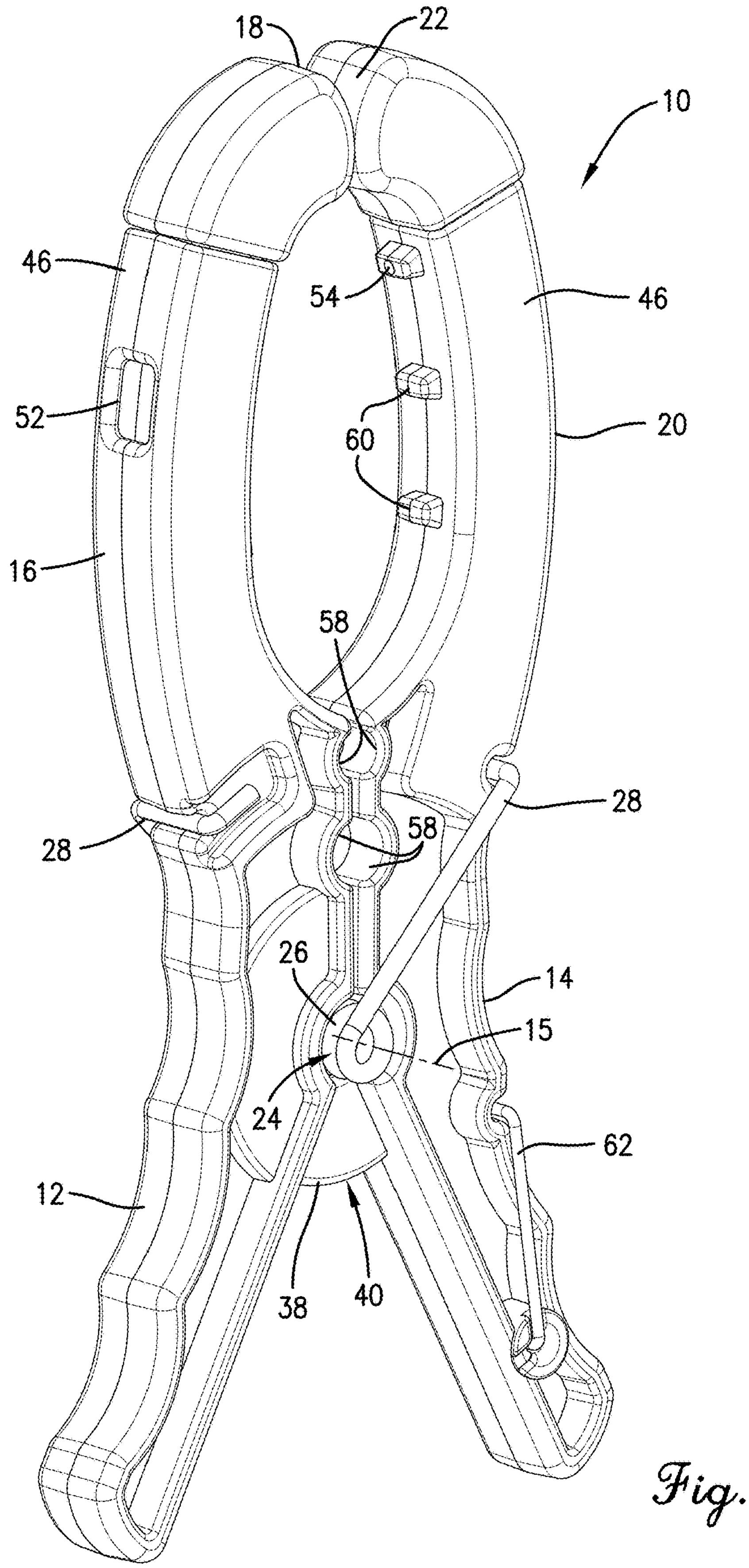
FIG. 1 is a front, left side perspective view of a first embodiment of a tool in the form of an adjustable clamp in accordance with the present disclosure and shown with each of its first and second jaws in a retracted position.
Figure 2:
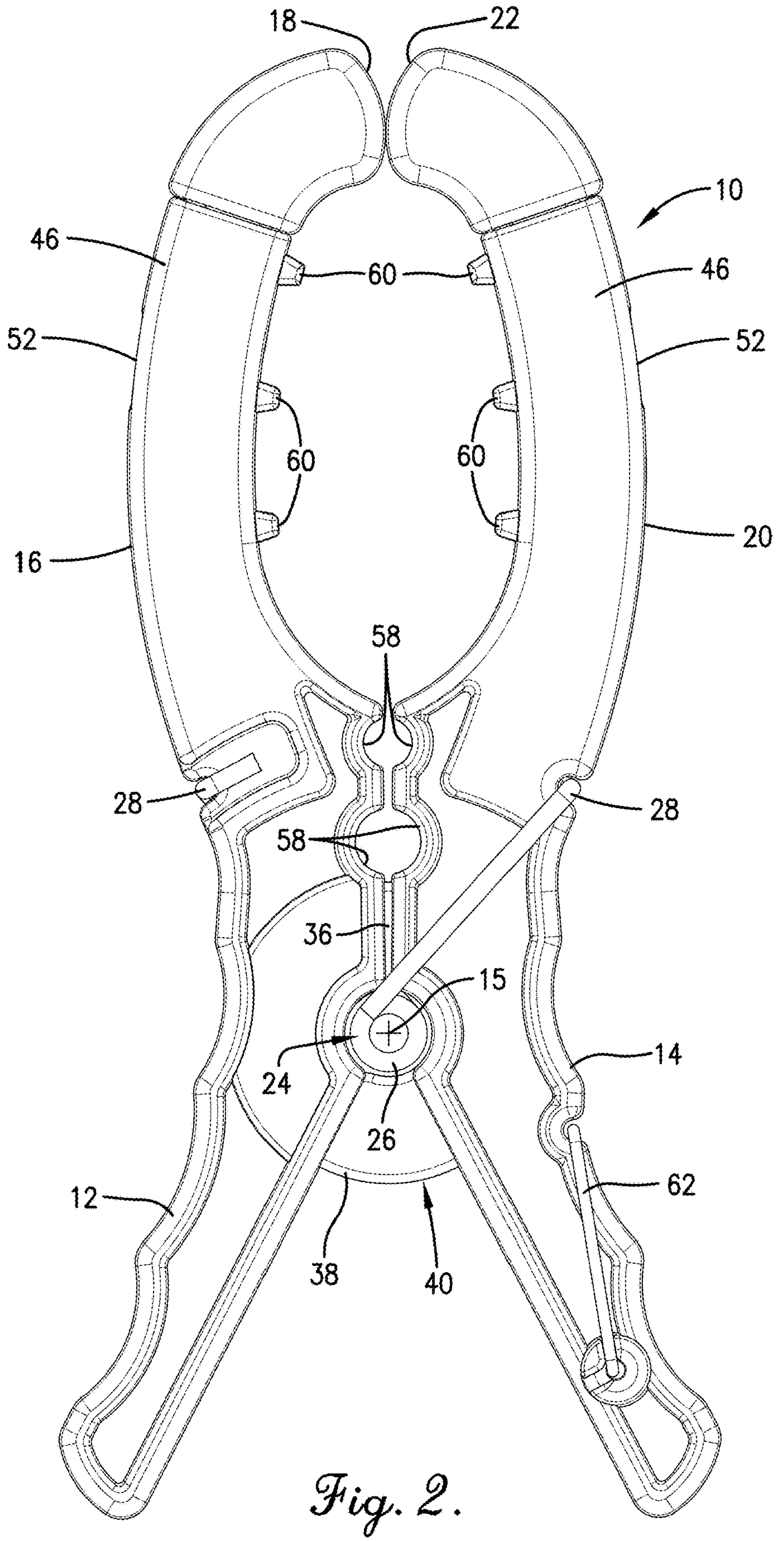
FIG. 2 is front elevation view of the first embodiment of the tool.
Figure 3:
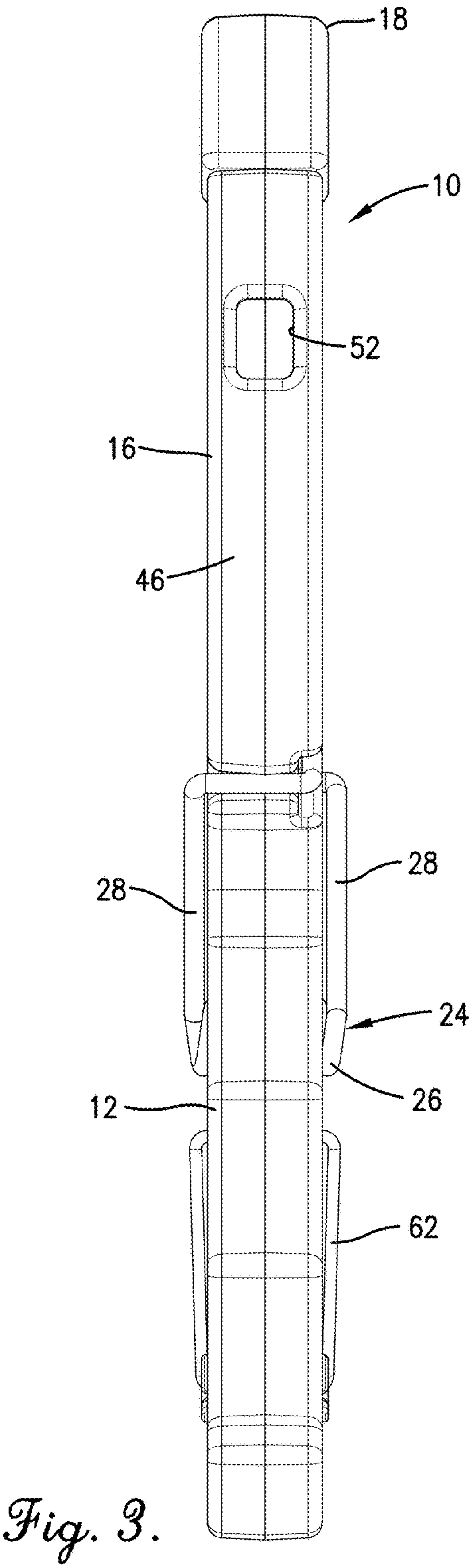
FIG. 3 is a left side elevation view of the first embodiment of the tool.
Figure 4:
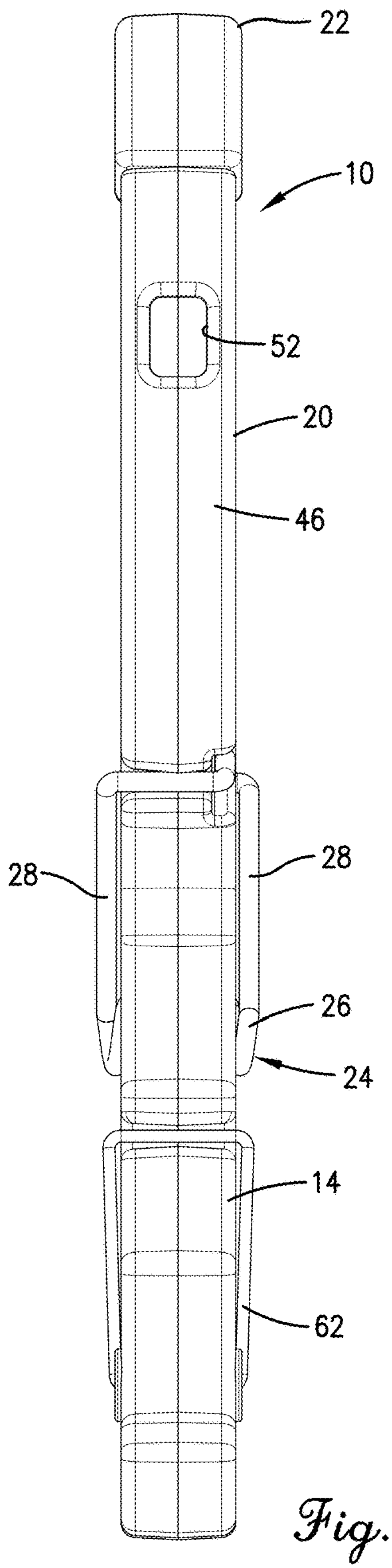
FIG. 4 is a right side elevation view of first embodiment of the tool.
Figure 5:
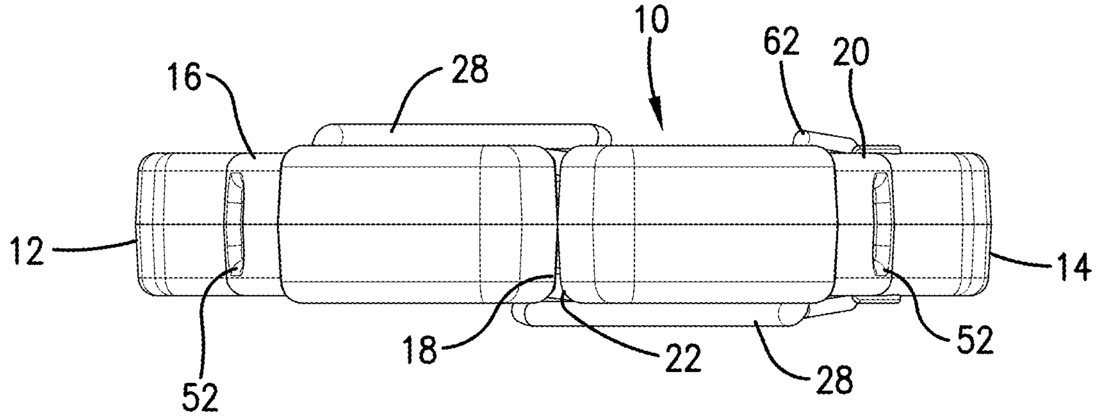
FIG. 5 is a top plan view of the first embodiment of the tool.
Figure 6:
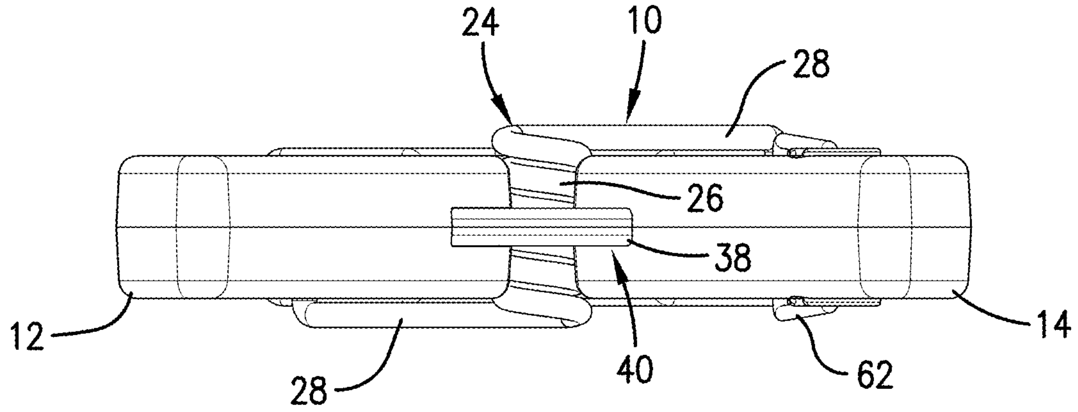
FIG. 6 is a bottom plan view of the first embodiment of the tool.
Figure 7:
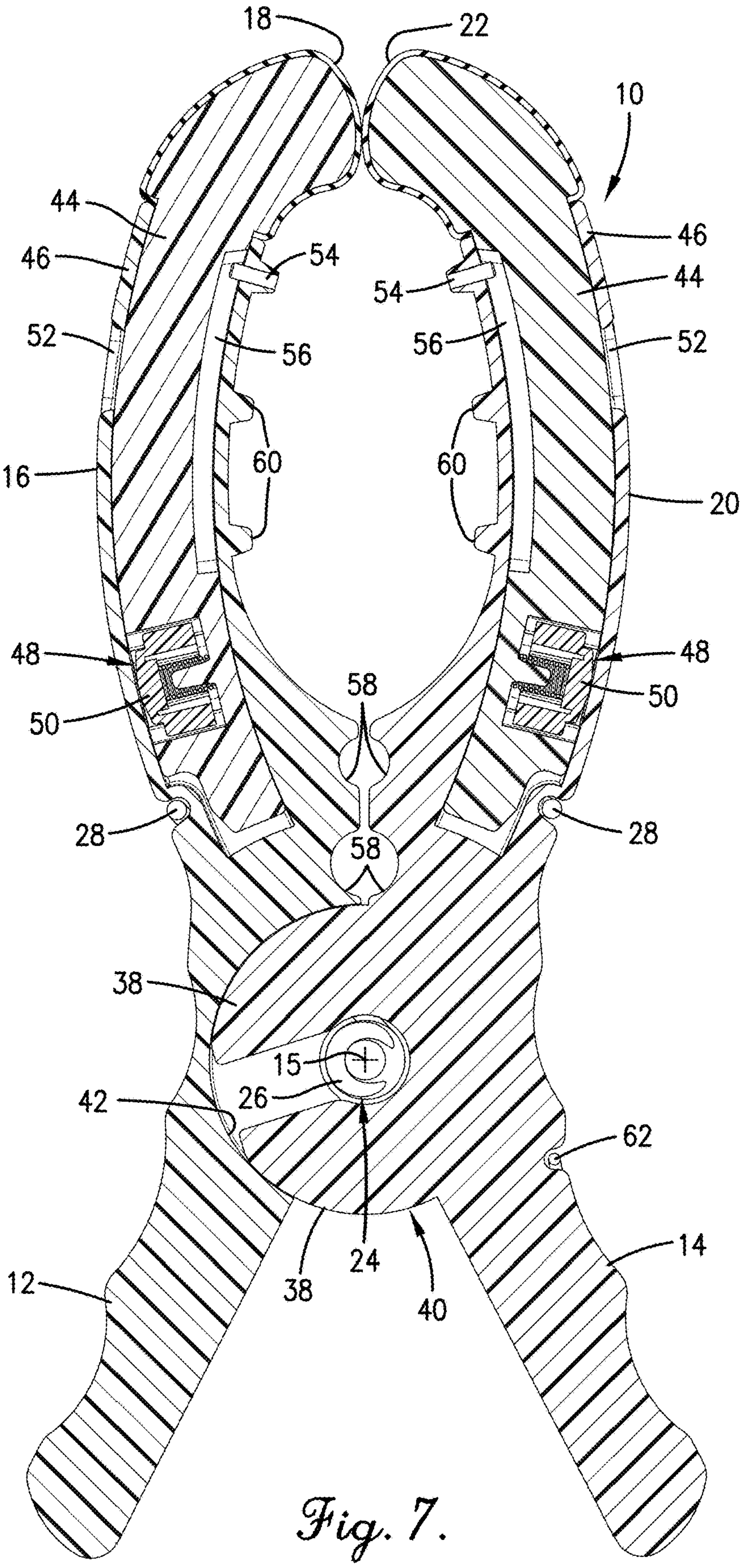
FIG. 7 is a front elevation view, taken in vertical section, of the first embodiment of the tool.
Figure 8:
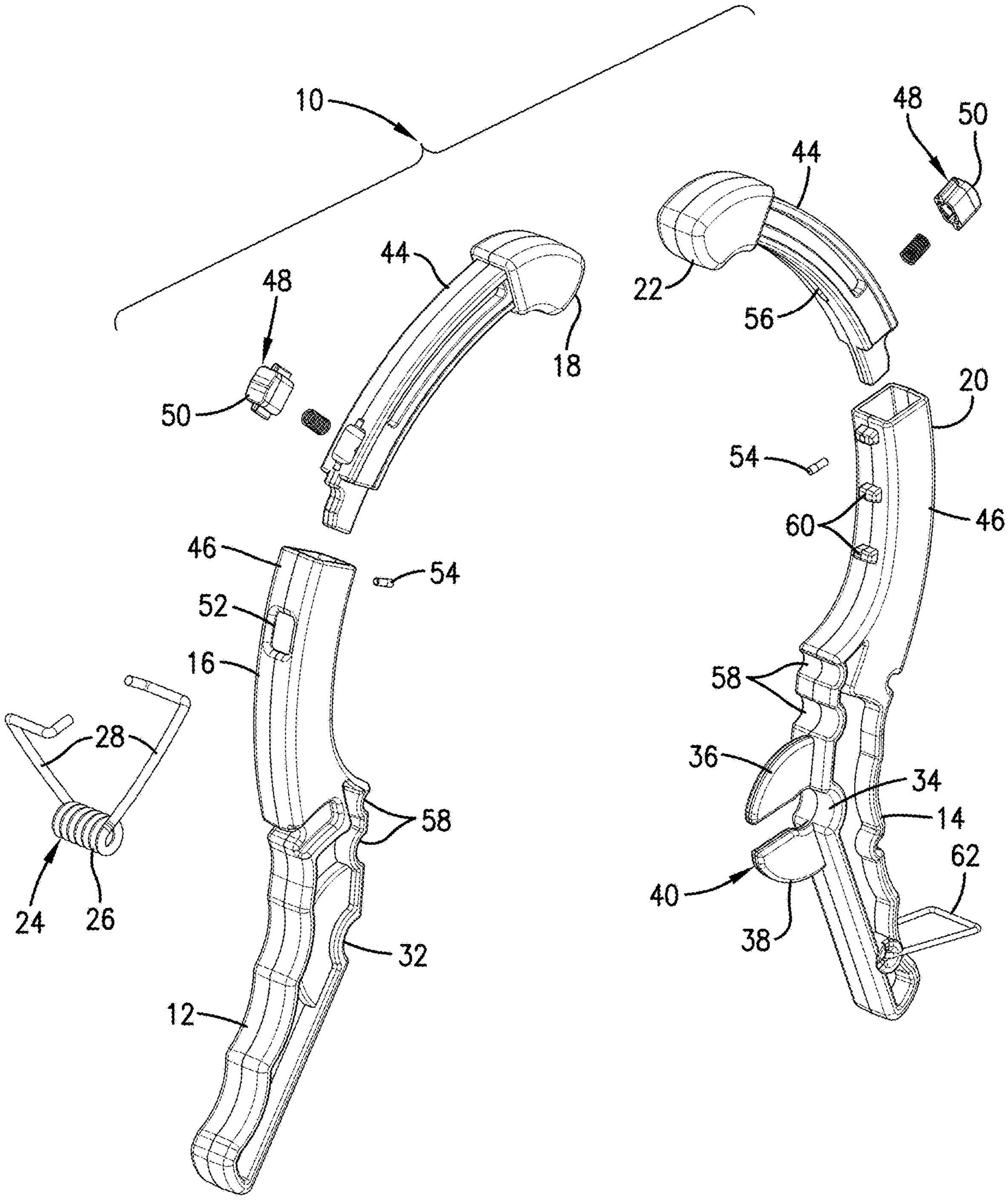
FIG. 8 is a left side exploded perspective view of the first embodiment of the tool.
Figure 9:
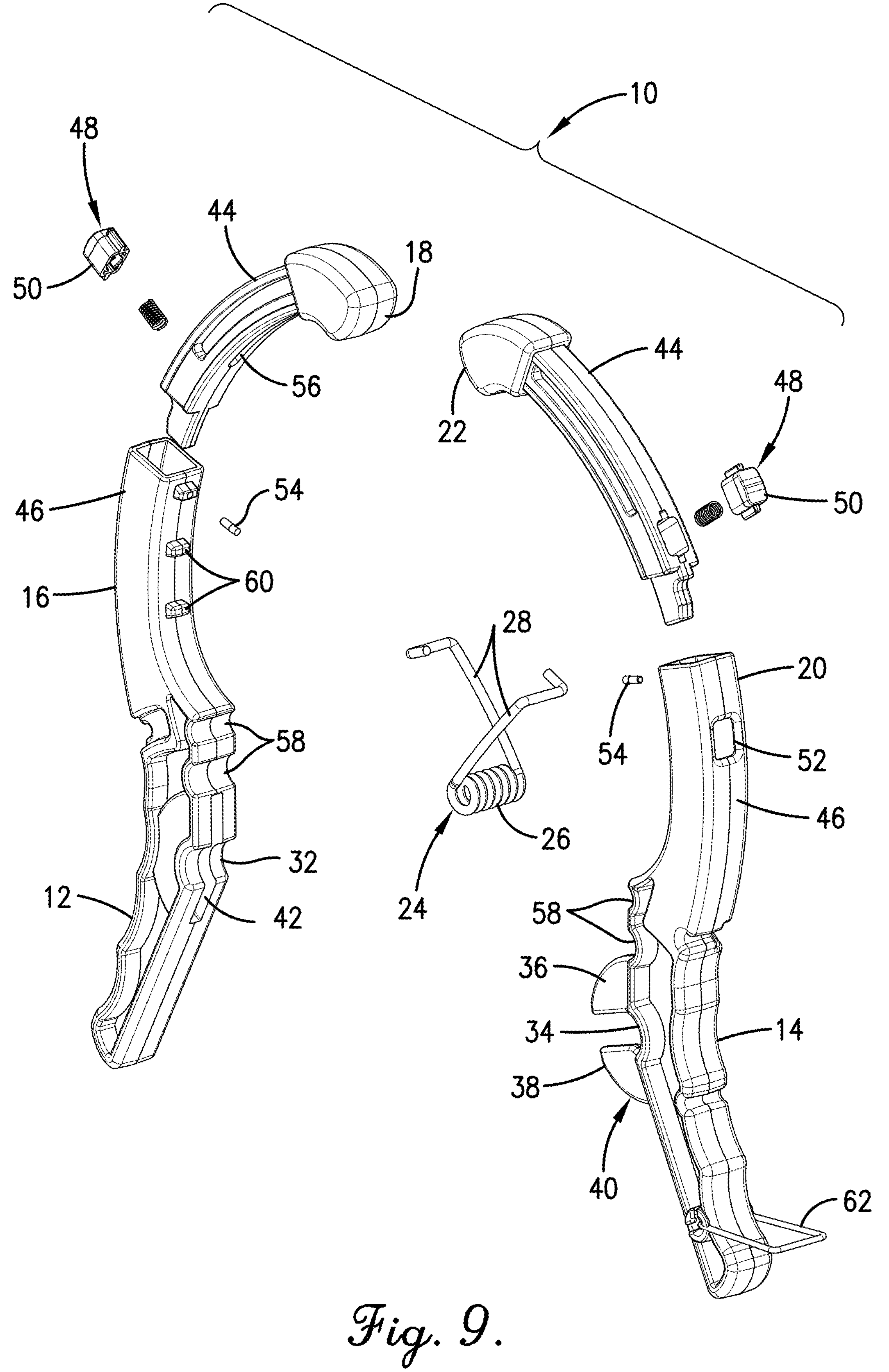
FIG. 9 is a right side exploded perspective view of the first embodiment of the tool.
Figure 10:
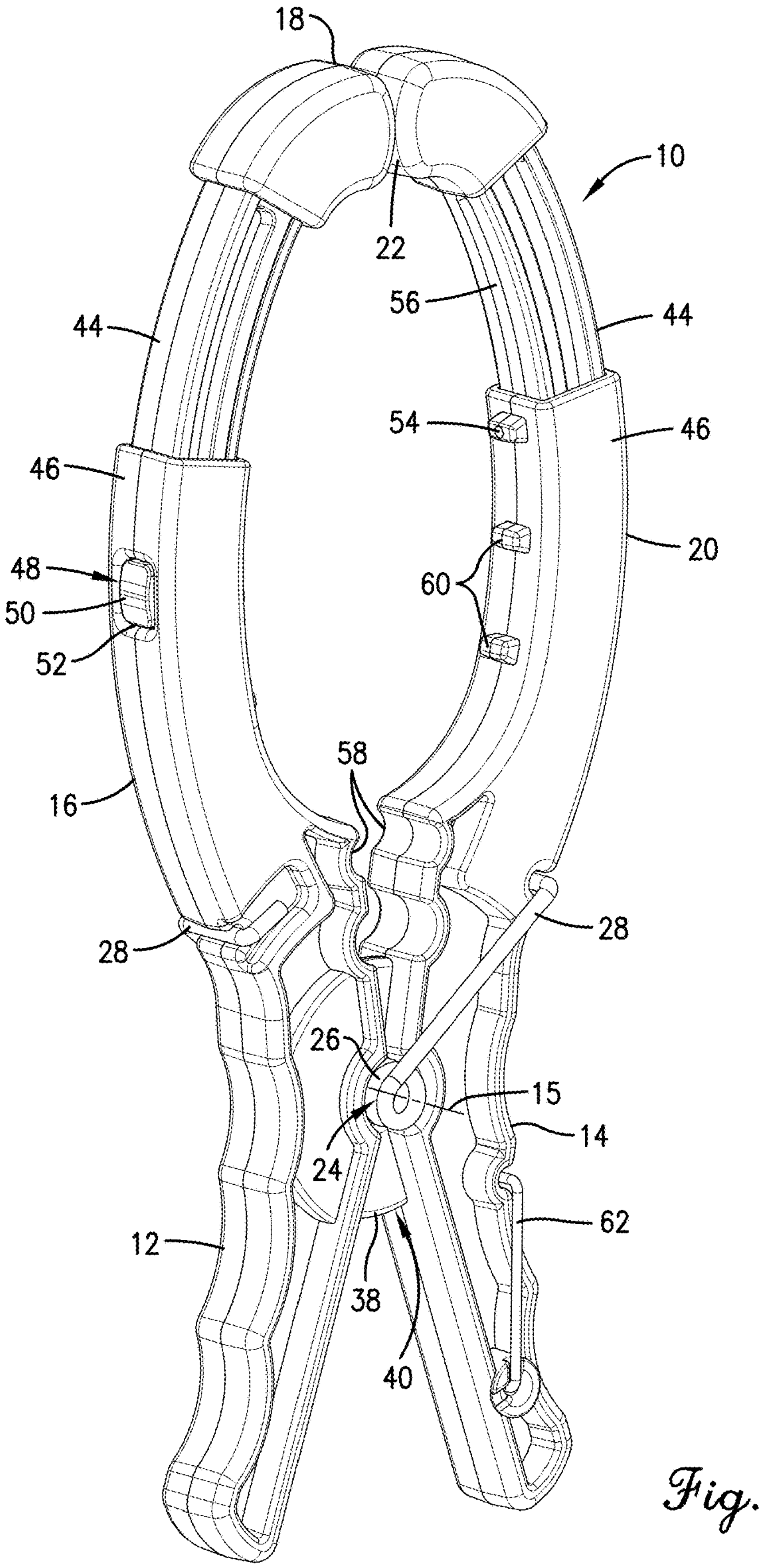
FIG. 10 is a front, left side perspective view of the first embodiment of the tool shown with each of its first and second jaws in an extended position.
Figure 11:
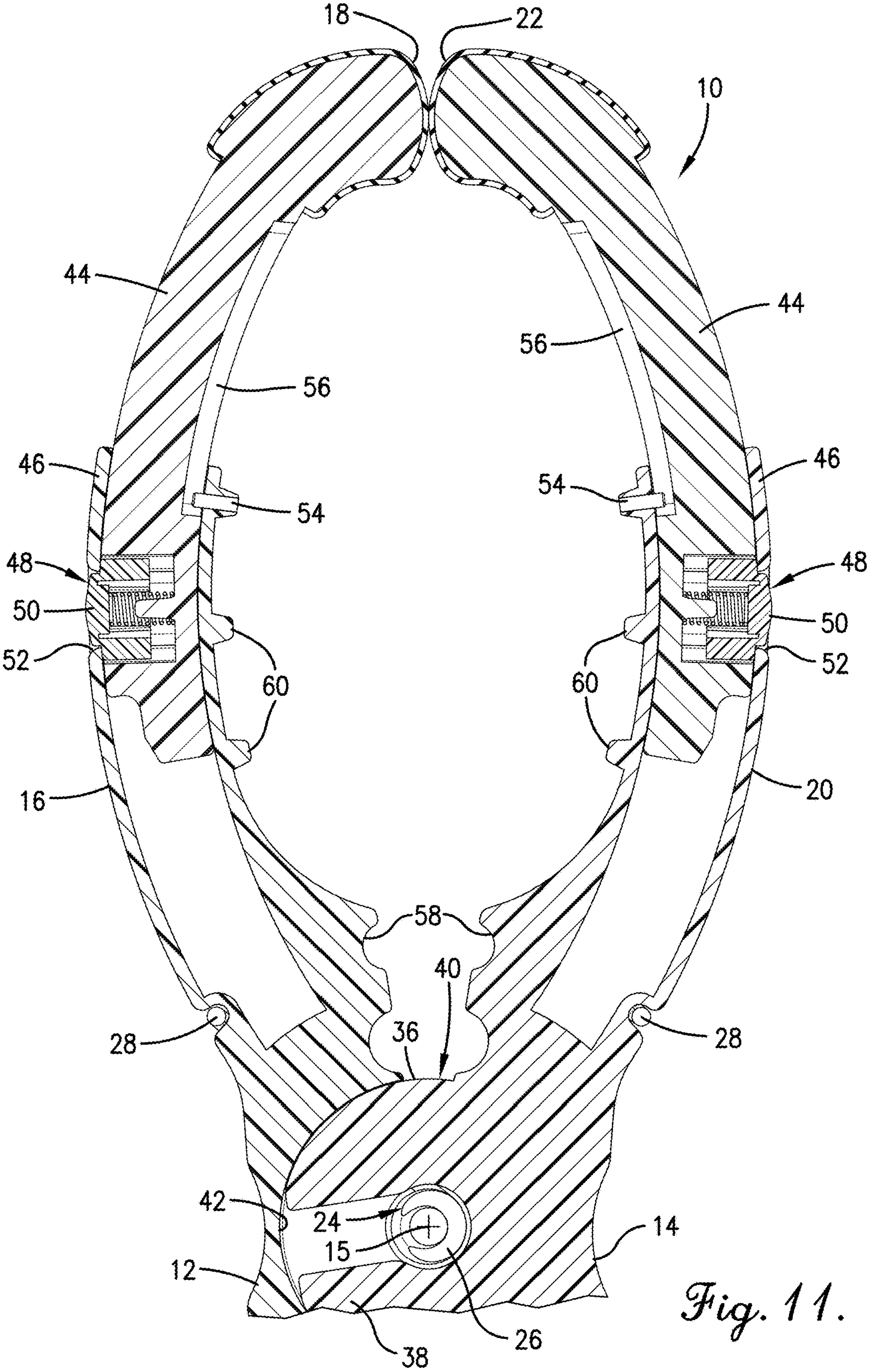
FIG. 11 is a fragmentary, front elevation view, taken in vertical section, of the first embodiment of the tool shown with its first and second jaws in their extended positions.
Figure 12:
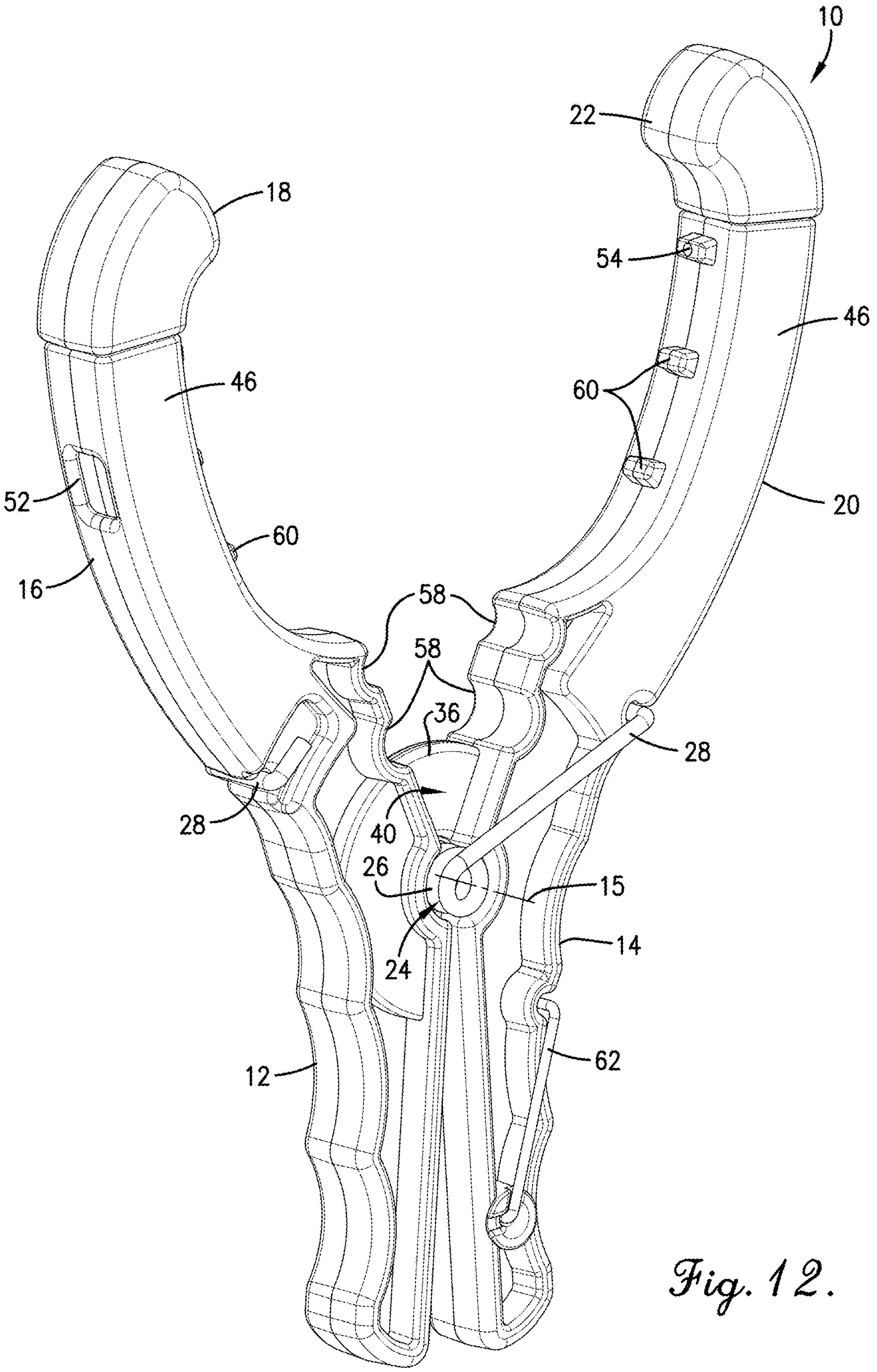
FIG. 12 is a front, left side perspective view of the first embodiment of the tool shown in an expanded configuration with its first and second jaws in their retracted positions.
Figure 13:
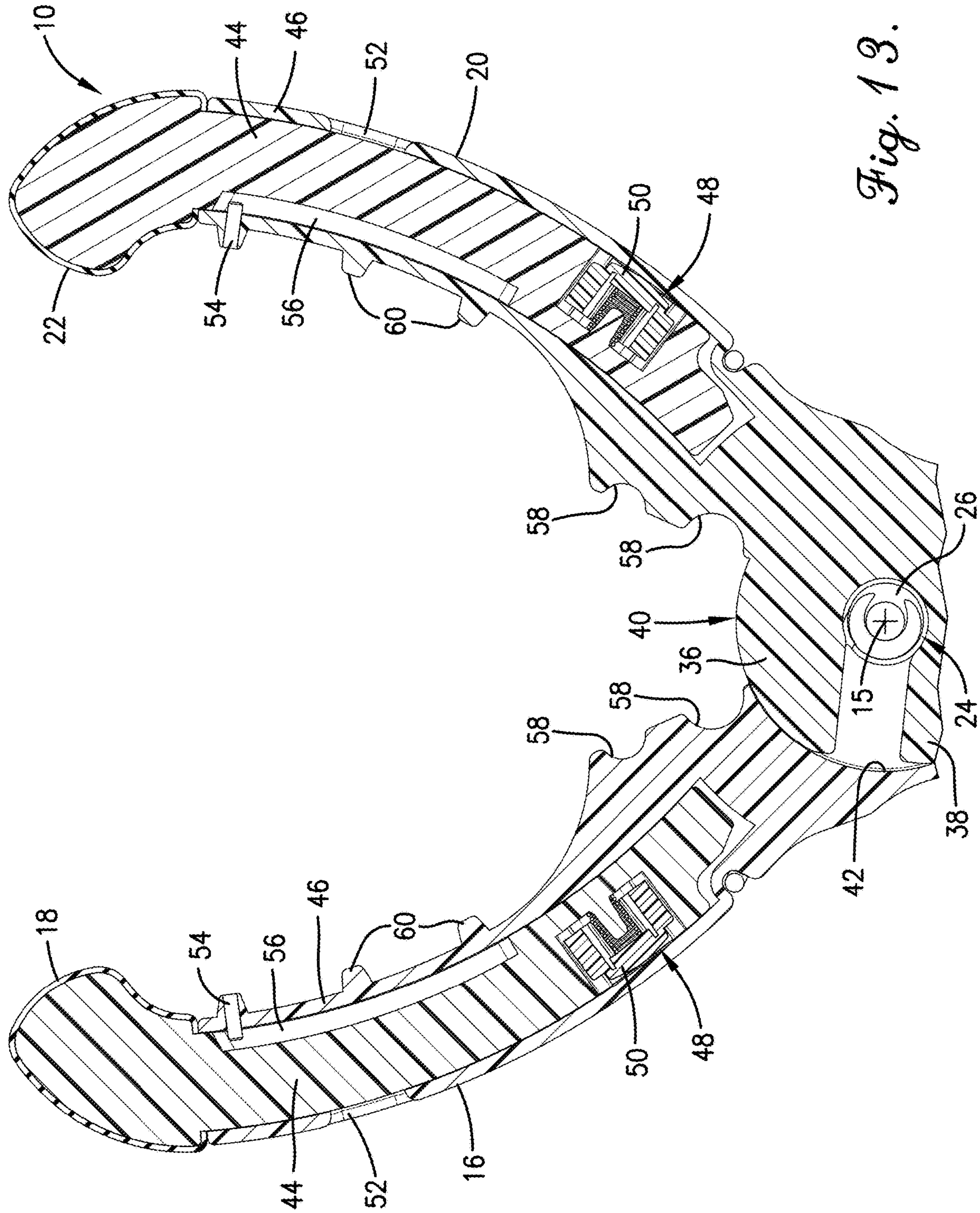
FIG. 13 is a fragmentary, front elevation view, taken in vertical section, of the first embodiment of the tool shown in an expanded configuration with its first and second jaws in their retracted positions.

Turning now to the drawings in greater detail and initially to FIGS. 1-13, a tool in the form of an adjustable clamp 10 comprises a first handle 12 and a second handle 14 that are pivotally joined together about a pivot axis 15 and movable in directions toward and away from each other. The first handle 12 has a first jaw 16 that extends longitudinally from the first handle 12 and ends in a first nose tip 18. The second handle 14 similarly has a second jaw 20 that extends longitudinally from the second handle 14 in opposition to the first jaw 16 and ends in a second nose tip 22. The first and second jaws 16 and 20 are each movable between retracted and extended positions that allow their longitudinal length to selectively increase and decrease so that the clamp is adaptable for different uses, as described in greater detail below.

The pivot axis 15 for the first and second handles 12 and 14 is located so that movement of the first and second handles 12 and 14 in a direction towards each other causes the first and second jaws 16 and 20 to move in an opposite direction away from each other to increase an opening between the first and second jaws 16 and 20. Conversely, movement of the first and second handles 12 and 14 in a direction away from each other causes the first and second jaws 16 and 20 to move in an opposite direction toward each other to decrease the opening between the first and second jaws 16 and 20. In one embodiment, the movement of the first and second jaws 16 and 20 toward each other will bring the first and second nose tips 18 and 22 into contact with each other. The first and second jaws 16 and 20 can be formed with facing longitudinally concave surfaces to create and maintain the opening between the first and second jaws 16 and 20 even when the first and second nose tips 18 and 22 are in contact with each other.

The clamp 10 in one embodiment includes a spring 24 associated with the first and second handles 12 and 14 that exerts a biasing force to move the first and second handles 12 and 14 in a direction away from each other and move the first and second jaws 16 and 20 in an opposite direction toward each other to cause the first and second nose tips 18 and 22 to apply a clamping force to an object. In one embodiment, the object can be a blanket made of rubber or another electrically insulating material that is draped over a live power line to shield a lineman from inadvertently coming into contact with the live power line.

The spring 24 can comprise an intermediate coiled portion 26 that forms the pivot axis for the first and second handles 12 and 14 and tangential arms 28 and 30 that extend from opposite ends of the coiled portion 26 and respectively engage against the first and second handles 12 and 14 or against the first and second jaws 16 and 20.

The intermediate coiled portion 26 of the spring 24 can be nested within facing arcuate segments 32 and 34 of the first and second handles 12 and 14 with the tangential arms 28 wrapping around and transmitting the biasing force to the first and second handles 12 and 14, respectively. A pair of planar quadrants 36 and 38 that form a semi-circular guide 40 can extend from the second handle 14 on opposite sides of the intermediate coiled portion 26 of the spring 24 into a complemental semi-circular guide slot 42 formed in the first handle 12. The biasing force from the spring 24 maintains the guide 40 within the guide slot 42 while allowing the guide 40 to rotate within the guide slot 42 during movement of the first and second handles 12 and 14 in the directions towards and away from each other and thereby maintain the first and second handles 12 and 14 in planar alignment during such movement.

Figure 14:
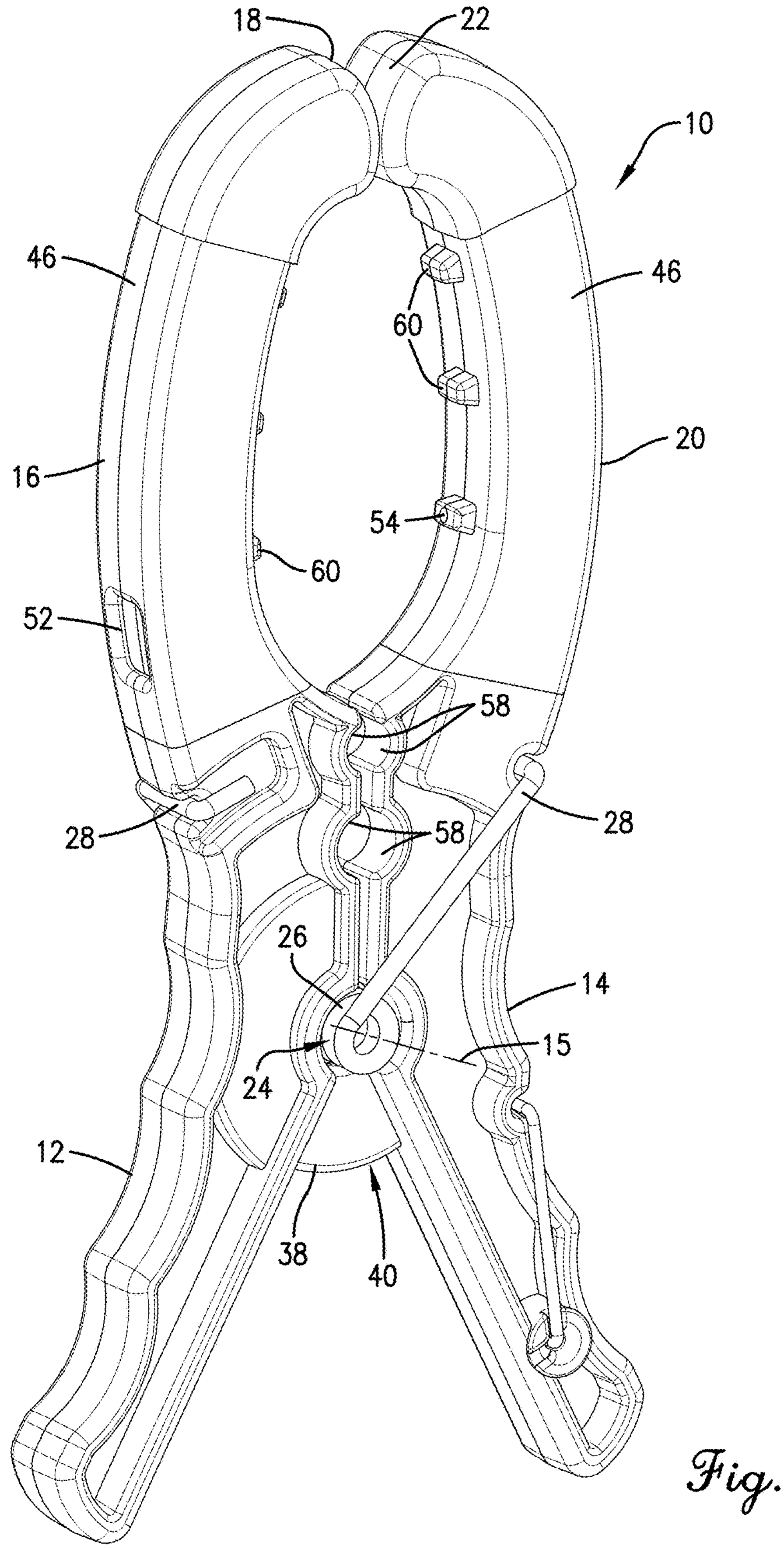
FIG. 14 is a front, left side perspective view of a second embodiment of a tool in the form of an adjustable clamp in accordance with the present disclosure and shown with each of its first and second jaws in a retracted position.
Figure 15:
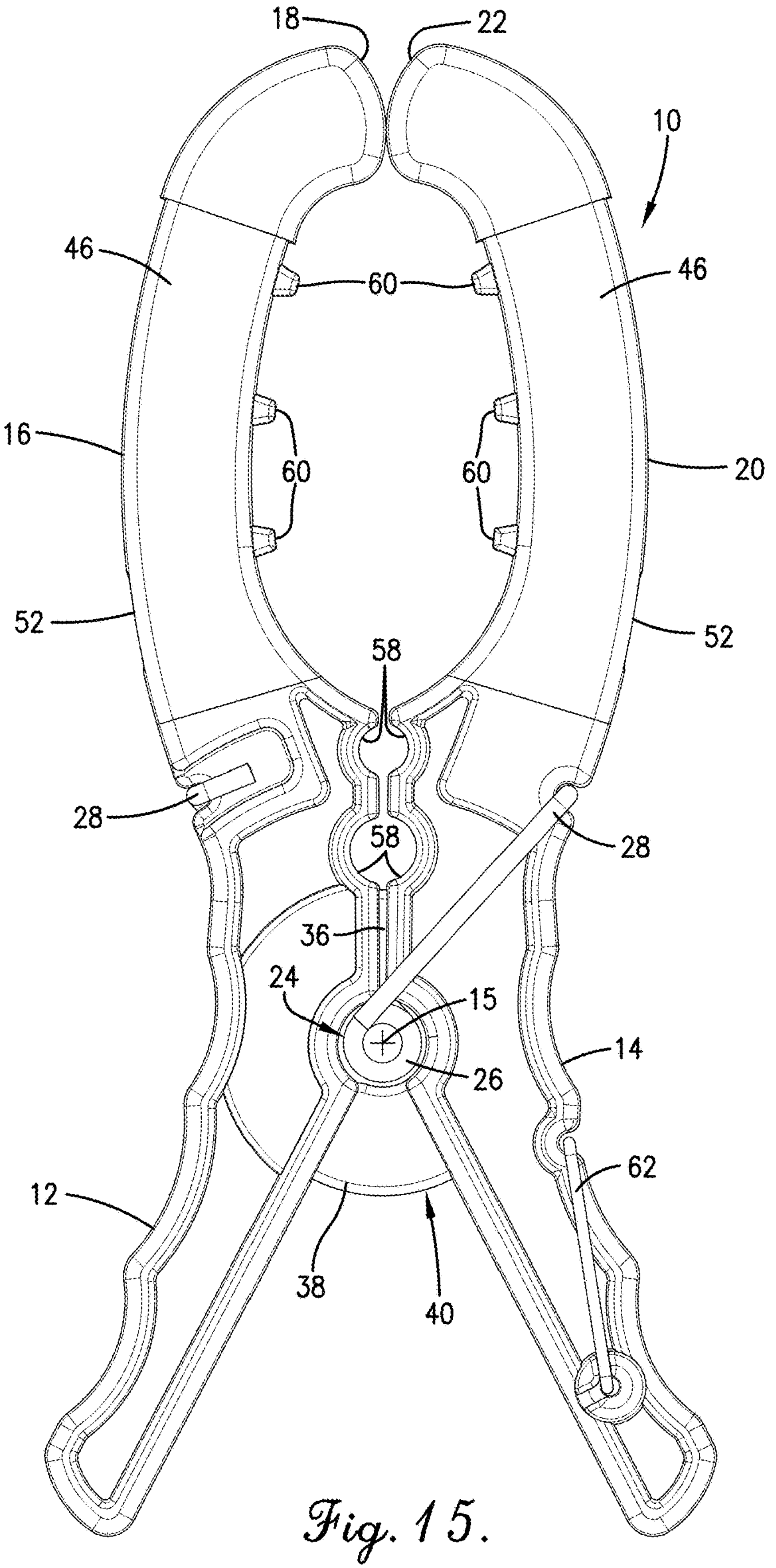
FIG. 15 is a front elevation view of the second embodiment of the tool.
Figure 16:
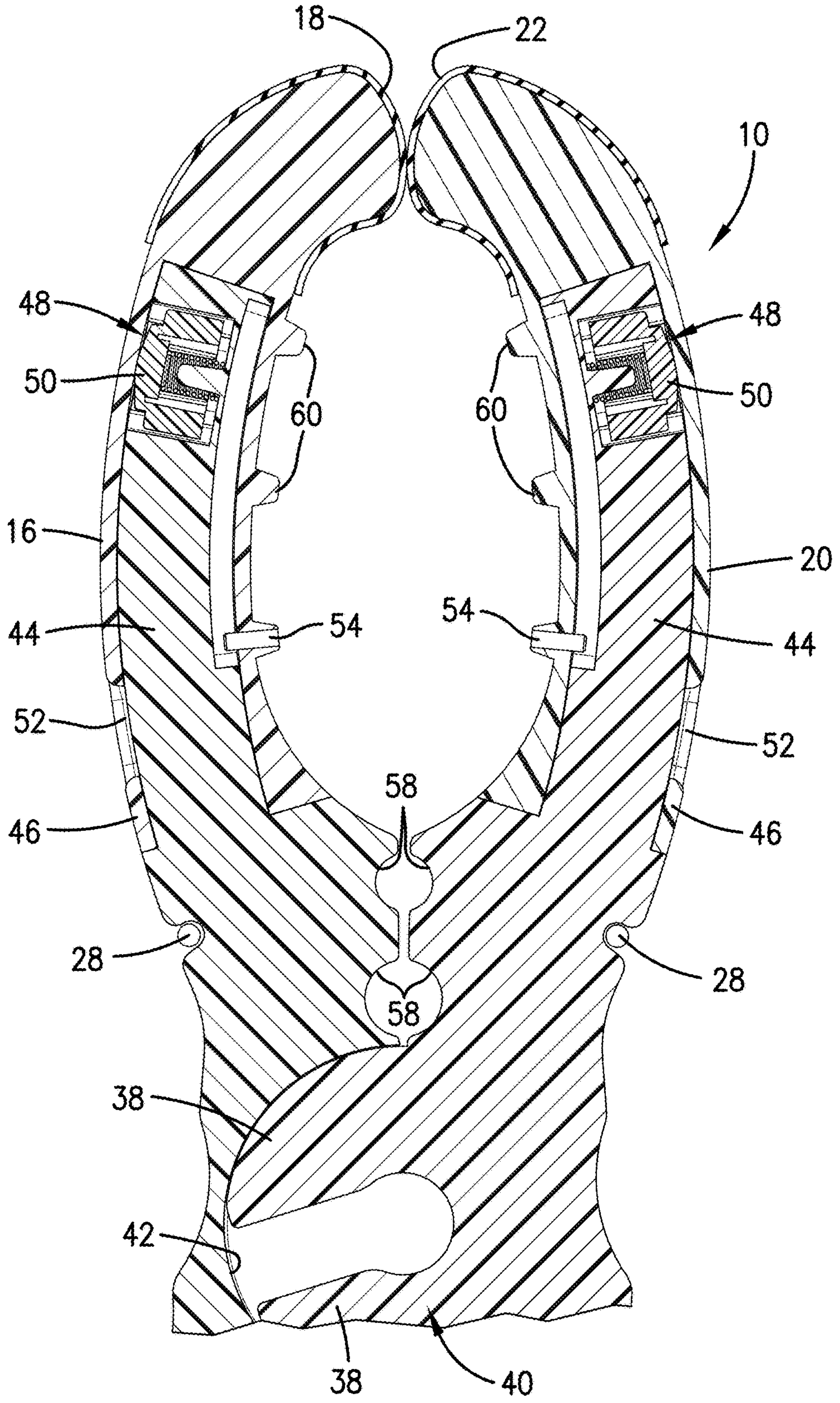
FIG. 16 is a fragmentary, front elevation view, taken in vertical section, of the second embodiment of the tool.
Figure 17:
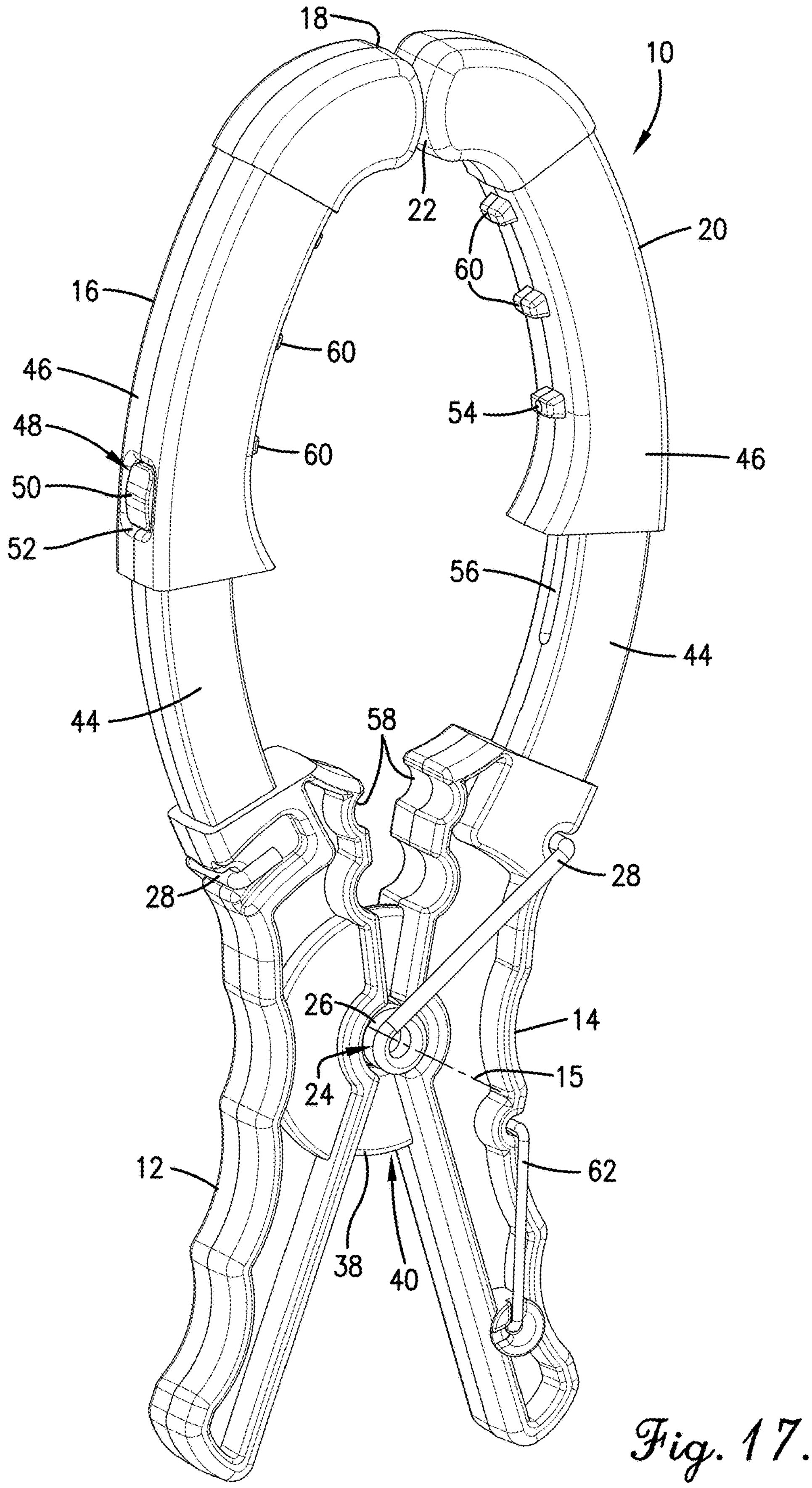
FIG. 17 is a front, left side perspective view of the second embodiment of the tool shown with each of its first and second jaws in an extended position.
Figure 18:
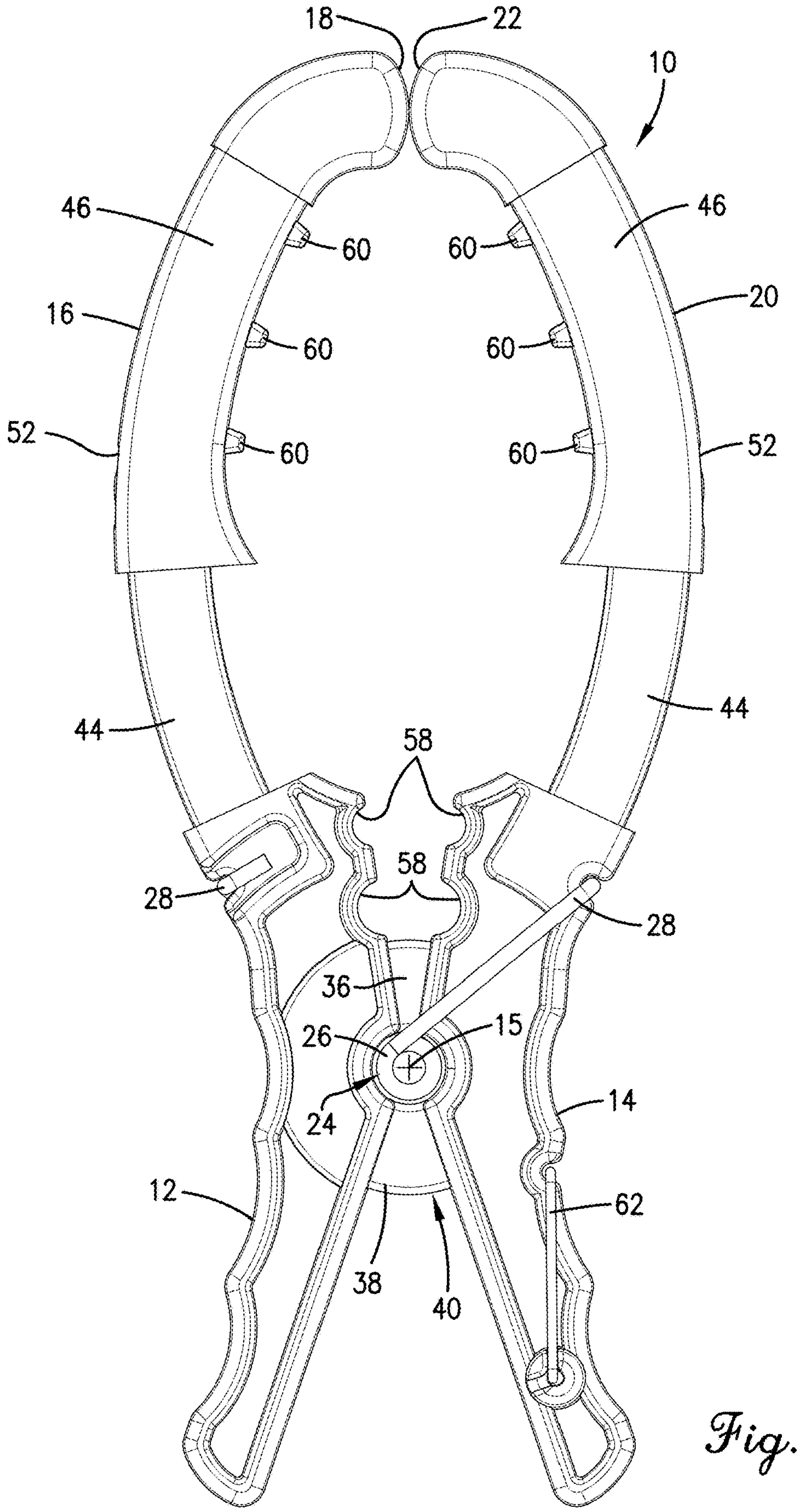
FIG. 18 is a front elevation view of the second embodiment of the tool shown with its first and second jaws in their extended positions.
Figure 19:
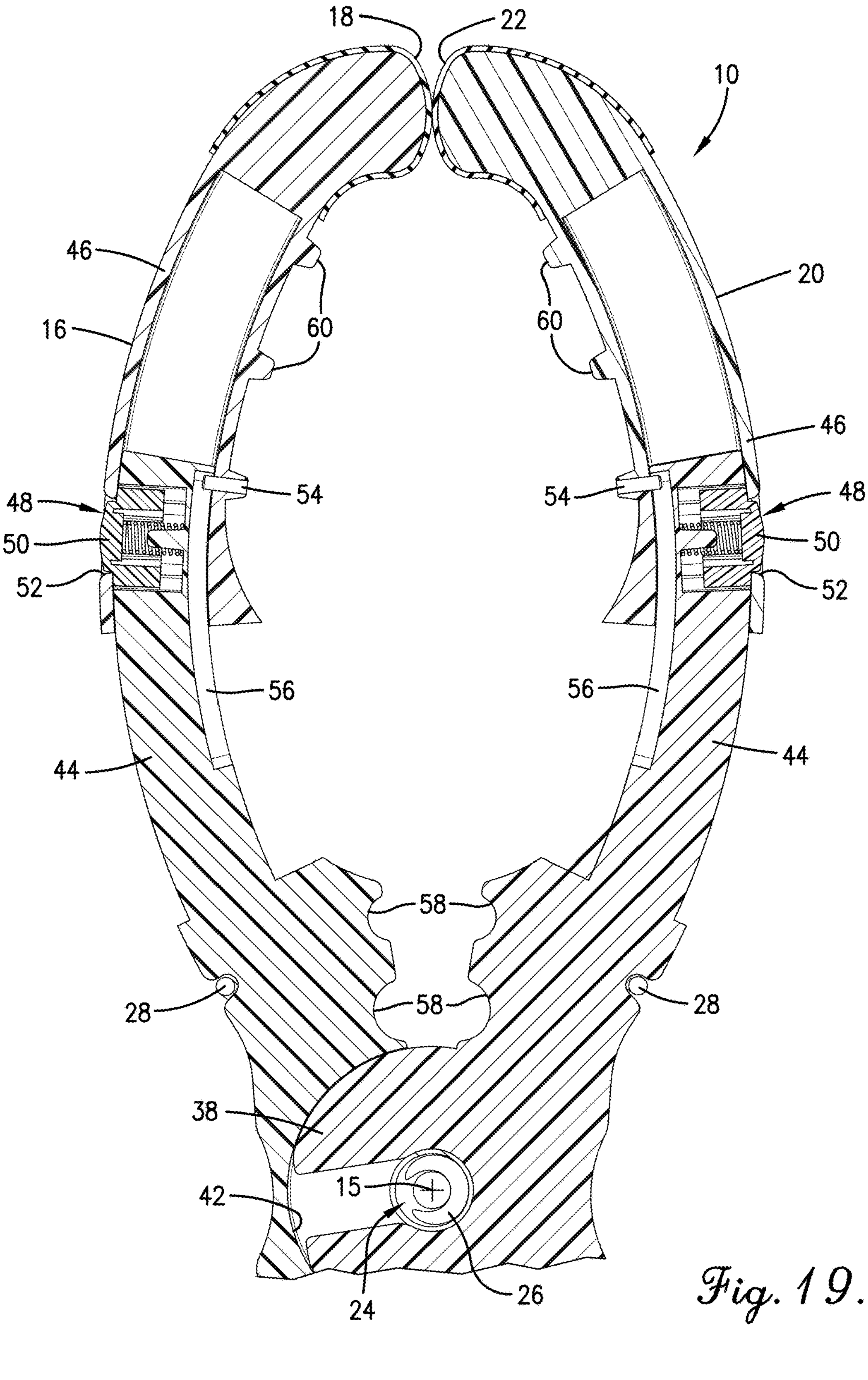
FIG. 19 is a front elevation view, taken in vertical section, of the second embodiment of the tool shown with its first and second jaws in their extended positions.

Each of the first and second jaws 16 and 20 comprises an inner portion 44 that is housed within an outer portion 46 in a manner to allow relative movement between the inner portion 44 and the outer portion 46 to move the first and second jaws 16 and 20 between a retracted position and an extended position to decrease and increase a longitudinal length of the first and second jaws 16 and 20. In the embodiment illustrated in FIGS. 1-13, the outer portions 46 are fixed to and extend longitudinally from the first and second handles 12 and 14 and the inner portions 44 are slidable from within the outer portions 46. In the embodiment illustrated in FIGS. 14-19, the inner portions 44 are fixed to and extend longitudinally from the first and second handles 12 and 14 and the outer portions 46 are slidable along the inner portions 44. The first and second nose tips 18 and 22 can be formed as sleeves that are secured at the free ends of the slidable inner portions 44 or the slidable outer portions 46.

The first and second jaws 16 and 20 each include a releasable lock 48 that can be used to prevent relative sliding movement between the inner and outer portions 44 and 46. In one embodiment, the lock 48 can be used to maintain the first and second jaws 16 and 20 in their extended positions. In another embodiment, the lock 48 can be used to additionally maintain the first and second jaws 16 and 18 in their retracted positions and/or one or more intermediate positions between the extended and retracted positions.

In one exemplification, the locks 48 can comprise a spring-biased detent 50 carried by the inner portions 44 of the first and second jaws 16 and 20 and an opening 52 positioned in the outer portions 46 of the first and second jaws 16 and 20 at a location to receive the detent 50 and prevent the relative movement between the inner and outer portions 44 and 46 when the first and second jaws 16 and 20 are in their extended positions. One or more additional openings 52 may be provided at one or more additional locations to receive the detent 50 and prevent relative movement between the inner and outer portions 44 and 46 when the first and second jaws 16 and 20 are in their retracted positions and/or the intermediate positions. The locks 48 can be released to allow relative sliding movement between the inner and outer portions 44 and 46 by depressing the detent 50 and initiating sliding movement between the inner and outer portions 44 and 46 to move the detent 50 out of alignment with the opening 52.

In order to prevent removal of the inner portions 44 from the outer portions 46, a stop pin 54 can be fixed in the outer portion 46 and extend into a closed-ended slot 56 formed in the inner portion 44. Engagement of the stop pin 54 with the closed end of the slot 56 stops further sliding movement between the inner and outer portions 44 and 46 and either prevents removal of the slidable inner portion 44 from the fixed outer portion 46 or prevents removal of the slidable outer portion 46 from the fixed inner portion 44 of the first and second jaws 16 and 20.

The first and second jaws 16 and 20 can each include one or more semi-circular notches 58 that allow the first and second jaws 16 and 20 to grip wires within the notches 58 when the clamping force is applied. The first and second jaws 16 and 20 may themselves have an arcuate configuration so that they form a generally oval or other shaped opening in the space between the first and second jaws 16 and 20. Raised gripping nubs 60 can be provided at spaced apart locations on the facing surfaces of the first and second jaws 16 and 20 to facilitate gripping of an object, such as the electrically insulation blanket, and a latch 62 can be provided to hold the first and second handles 12 and 14 in a partially compressed configuration to maintain the first and second jaws 16 and 20 in a partially open configuration. The first and second jaws 16 and 20 and the first and second handles 12 and 14 can be made of an electrically insulating material, such as a polymeric material, or any other suitable material.

Additional Considerations

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

In the specification and claims, reference will be made to several terms, which shall be defined to have the following meanings. The singular forms “a,” “an,” and “the” include plural references unless the context clearly dictates otherwise.

Approximating language, as used herein throughout the specification and the claim, may be applied to modify any quantitative representation that could permissibly vary without resulting in a change in the basic function to which it is related. Accordingly, a value modified by a term or terms, such as “about” and “substantially” are not to be limited to the precise value specified. In at least some instances, the approximating language may correspond to the precision of an instrument for measuring the value. Range limitations may be combined and/or interchanged. Such ranges are identified and include all the sub-ranges contained therein unless context or language indicates otherwise.

As used herein, the terms such as “side” and similar terms are used herein solely for convenience and should be understood only in relation to each other.

The terms “secured,” “coupled,” “attached to,” and the like refer to both direct coupling, fixing, or attaching, as well as indirect coupling, fixing, or attaching through one or more intermediate components or features, unless otherwise specified herein.

Although the present application sets forth a detailed description of different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claimed is:

1. An adjustable clamp comprising:

a first handle;

a first jaw extending from the first handle and ending in a first nose tip opposite from the first handle, the first jaw comprising an inner portion that is housed within an outer portion in a manner to allow relative movement between the inner portion and the outer portion to move the first jaw between a retracted position and an extended position to decrease and increase a longitudinal length of the first jaw;

a second handle;

a second jaw extending from the second handle and ending in a second nose tip opposite from the second handle, the first jaw comprising an inner portion that is housed within an outer portion in a manner to allow relative movement between the inner portion and the outer portion to move the second jaw between a retracted position and an extended position to decrease and increase a longitudinal length of the second jaw;

wherein the first jaw is arcuate and has a longitudinally concave surface that faces in a direction toward the second jaw and the second jaw is arcuate and has a longitudinally concave surface that faces in a direction toward the first jaw, the longitudinally concave surfaces creating an opening between the first and second jaws;

the first and second handles being pivotally joined together so that movement of the first and second handles in a direction towards each other moves the first and second jaws in an opposite direction away from each other;

a spring associated with the first and second handles that exerts a biasing force to move the first and second handles in a direction away from each other and cause the first and second nose tips to apply a clamping force; and a lock in each of the first jaw and the second jaw, wherein the lock in the first jaw comprises a spring-biased detent carried by the inner portion of the first jaw and an opening positioned in the outer portion of the first jaw at a location to receive the spring-biased detent and prevent relative movement between the inner and outer portions when the first jaw is in the extended position and wherein the lock in the second jaw comprises a spring-biased detent carried by the inner portion of the second jaw and an opening positioned in the outer portion of the second jaw at a location to receive the spring-biased detent and prevent relative movement between the inner and outer portions when the second jaw is in the extended position.

2. The adjustable clamp of claim 1, wherein the locks in each of the first and second jaws are released when the first and second jaws are in the retracted position to allow a slidable movement between the inner and outer portions of the first and second jaws.

3. The adjustable clamp of claim 2, including semicircular notches positioned in the first and second jaws separate from the opening between the first and second jaws to allow the first and second jaws to grip wires within the notches as a result of the spring exerting the biasing force.

4. The adjustable clamp of claim 3, wherein the outer portions of the first and second jaws each includes another opening positioned at a location to receive the spring-biased detent and prevent the relative movement between the inner and outer portions when the first jaw and the second jaw are at an intermediate position between the retracted and extended positions.

5. The adjustable clamp of claim 1, wherein the spring comprises an intermediate coiled portion that forms a pivot axis for the first and second handles and tangential arms that extend from opposite ends of the coiled portion and each engage against the first and second handles or against the first and second jaws.

6. The adjustable clamp of claim 1, wherein the first nose tip and the second nose tip are brought together by the spring exerting the biasing force while the first and second jaws are in the retracted position and while the first and second jaws are in the extended position.

7. The adjustable clamp of claim 1, wherein the inner portion of the first jaw is attached to the first nose tip, the outer portion of the first jaw is attached to the first handle, the inner portion of the second jaw is attached to the second nose tip, and the outer portion of the second jaw is attached to the second handle.

8. The adjustable clamp of claim 1, wherein the inner portion of the first jaw is attached to the first handle, the outer portion of the first jaw is attached to the first nose tip, the inner portion of the second jaw is attached to the second handle, and the outer portion of the second jaw is attached to the second nose tip.

9. The adjustable clamp of claim 1, wherein the first and second handles and the first and second jaws are constructed of a polymeric material.

10. The adjustable clamp of claim 1, including a stop pin extending from the outer portion into a slot in the inner portion of each of the first and second jaws to prevent removal of the inner portion from the outer portion and further including raised gripping nubs on facing surfaces of the first and second jaws.

11. An adjustable clamp comprising:

a first handle;

a first jaw extending from the first handle and ending in a first nose tip opposite from the first handle, the first jaw comprising an inner portion that is housed within an outer portion in a manner to allow relative movement between the inner portion and the outer portion to move the first jaw between a retracted position and an extended position to decrease and increase a longitudinal length of the first jaw;

a second handle;

a second jaw extending from the second handle and ending in a second nose tip opposite from the second handle, the first jaw comprising an inner portion that is housed within an outer portion in a manner to allow relative movement between the inner portion and the outer portion to move the second jaw between a retracted position and an extended position to decrease and increase a longitudinal length of the second jaw;

the first and second handles being pivotally joined together so that movement of the first and second handles in a direction towards each other moves the first and second jaws in an opposite direction away from each other;

a lock included with each of the first and second jaws that prevents slidable movement between the inner and outer portions of the first and second jaws when the first and second jaws are in the extended position and that may be released to allow slidable movement of the first and second jaws from the extended position, wherein the locks in each of the first and second jaws are released when the first and second jaws are in the retracted position to allow the sliding movement between the inner and outer portions of the first and second jaws; and a spring associated with the first and second handles that exerts a biasing force to move the first and second handles in a direction away from each other and cause the first and second nose tips to apply a clamping force, wherein the first jaw is arcuate and has a longitudinally concave surface that faces in a direction toward the second jaw and the second jaw is arcuate and has a longitudinally concave surface that faces in a direction toward the first jaw, the longitudinally concave surfaces creating an opening between the first and second jaws, wherein the first and second handles and the first and second jaws are constructed of a polymeric material.

12. The adjustable clamp of claim 11, including a latch associated with the first and second handles to hold the first and second handles in a partially compressed configuration to maintain the first and second jaws in a partially open configuration.

13. The adjustable clamp of claim 12, wherein the lock in the first jaw comprises a spring-biased detent carried by the inner portion of the first jaw and an opening positioned in the outer portion of the first jaw at a location to receive the detent and prevent the relative movement between the inner and outer portions when the first jaw is in the extended position and wherein the lock in the second jaw is a spring-biased detent carried by the inner portion of the second jaw and an opening positioned in the outer portion of the second jaw at a location to receive the detent and prevent the relative movement between the inner and outer portions when the second jaw is in the extended position.

14. The adjustable clamp of claim 13, wherein the outer portions of the first and second jaws each includes another opening positioned at a location to receive the spring-biased detent and prevent the relative movement between the inner and outer portions when the first jaw and the second jaw are at an intermediate position between the retracted and extended positions.

15. The adjustable clamp of claim 11, wherein the spring comprises an intermediate coiled portion that forms a pivot axis for the first and second handles and tangential arms that extend from opposite ends of the coiled portion and each engage against the first and second handles or against the first and second jaws.

16. The adjustable clamp of claim 11, wherein the inner portion of the first jaw is attached to the first nose tip, the outer portion of the first jaw is attached to the first handle, the inner portion of the second jaw is attached to the second nose tip, and the outer portion of the second jaw is attached to the second handle.

17. The adjustable clamp of claim 11, wherein the inner portion of the first jaw is attached to the first handle, the outer portion of the first jaw is attached to the first nose tip, the inner portion of the second jaw is attached to the second handle, and the outer portion of the second jaw is attached to the second nose tip.

18. An adjustable clamp comprising:

a first handle;

a first jaw extending from the first handle and ending in a first nose tip opposite from the first handle, the first jaw comprising an inner portion that is housed within an outer portion in a manner to allow relative movement between the inner portion and the outer portion to move the first jaw between a retracted position and an extended position to decrease and increase a longitudinal length of the first jaw;

a second handle;

a second jaw extending from the second handle and ending in a second nose tip opposite from the second handle, the first jaw comprising an inner portion that is housed within an outer portion in a manner to allow relative movement between the inner portion and the outer portion to move the second jaw between a retracted position and an extended position to decrease and increase a longitudinal length of the second jaw;

the first and second handles being pivotally joined together so that movement of the first and second handles in a direction towards each other moves the first and second jaws in an opposite direction away from each other;

a spring associated with the first and second handles that exerts a biasing force to move the first and second handles in a direction away from each other and cause the first and second nose tips to apply a clamping force, the spring comprising an intermediate coiled portion that forms a pivot axis for the first and second handles and tangential arms that extend from opposite ends of the coiled portion and each engage against the first and second handles or against the first and second jaws;

semi-circular notches positioned in the first and second jaws to allow the first and second jaws to grip wires within the notches as a result of the spring exerting the biasing force; and the first jaw and the second jaw each including a lock comprising either a spring-loaded detent carried by the inner portion and an opening in the outer portion to receive the detent and releasably maintain the first and second jaws in the extended position or a spring-loaded detent carried by the outer portion and an opening in the inner portion to receive the detent and releasably maintain the first and second jaws in the extended position, wherein the first jaw has a longitudinally concave surface that faces in a direction toward the second jaw and the second jaw has a longitudinally concave surface that faces in a direction toward the first jaw, the longitudinally concave surfaces creating an opening between the first and second jaws that is separate from the notches, wherein the first and second handles and the first and second jaws are constructed of a polymeric material.

19. The adjustable clamp of claim 18, wherein the inner portion of the first jaw is attached to the first nose tip, the outer portion of the first jaw is attached to the first handle, the inner portion of the second jaw is attached to the second nose tip, and the outer portion of the second jaw is attached to the second handle.

20. The adjustable clamp of claim 18, wherein the inner portion of the first jaw is attached to the first handle, the outer portion of the first jaw is attached to the first nose tip, the inner portion of the second jaw is attached to the second handle, and the outer portion of the second jaw is attached to the second nose tip.

* * * * *